J. TINNEY.
Glue Pot.
No. 86,788.
Patented Feb. 9, 1869.
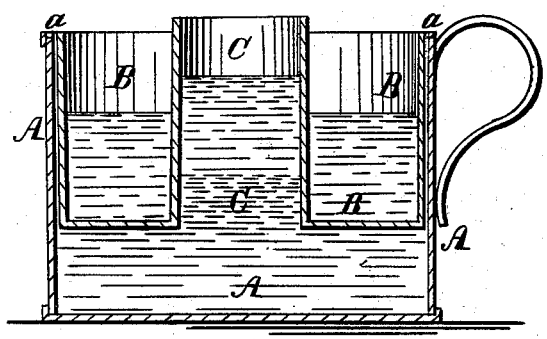
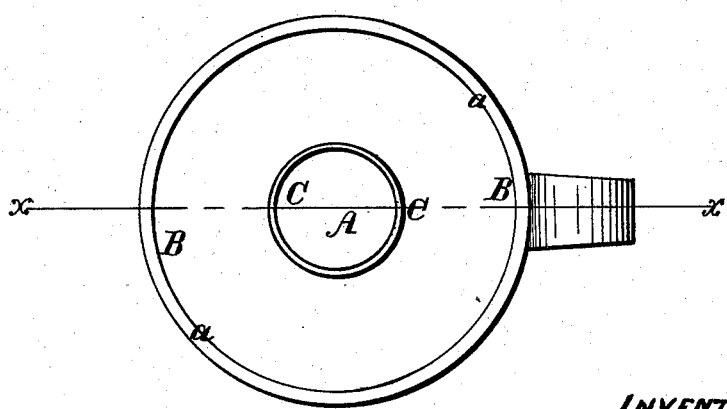

JOSEPH TINNEY, OF WESTFIELD, NEW YORK.

Letters Patent No. 86,788, dated February 9, 1869.

IMPROVED GLUE-POT.

The Schedule referred to in these Letters Patent and making part of the same.

*To all whom it may concern:*

Be it known that I, JOSEPH TINNEY, of Westfield, in the county of Chautauqua, and State of New York, have invented a new and improved Glue-Pot; and I do hereby declare that the following is a full, clear, and exact description thereof, which will enable others skilled in the art to make and use the same, reference being had to the accompanying drawings, forming part of this specification, in which—

Figure 1 represents a sectional elevation of my improved glue-pot.

Figure 2 is a plan or top view of the same.

Similar letters of reference indicate corresponding parts.

This invention relates to a new glue-pot, in which the vessel for containing the glue is made annular, or otherwise, so that a pipe is formed in it, in which the water from the lower vessel may stand. Thereby additional heating-surface is not only provided, but also an escape for the surplus steam, and an open water-vessel is produced, to allow the wetting of a sponge or cloth, for cleaning the surplus glue from the work, and for washing the brush without removing the upper glue-cup.

A, in the drawing, represents a cylindrical or other vessel, for holding the water.

B is the glue-cup.

It is provided with a flange, $a$, by means of which it is suspended from the upper edge of the vessel A, or it is otherwise suspended or supported, so that a water-space is left between its bottom and that of A.

Within the cup B is arranged an upright tube, C, which is open at both ends, as shown, and in which the water may rise to its proper level. This pipe is large enough to allow a sponge or cloth to be dipped into the water, for the aforementioned purpose.

The sides of the tube serve also as additional heating-surfaces for melting the glue.

Having thus described my invention,

I claim as new, and desire to secure by Letters Patent—

A glue-cup, B, provided with an open tube, which projects from its bottom, so that the water can stand in it or can be reached through it, substantially as herein shown and described, for the purpose specified.

The above specification of my invention signed by me, this 30th day of December, 1868.

JOSEPH TINNEY.

Witnesses:
GEORGE WILSON,
JOHN LUTHI.